(12) United States Patent
Kim et al.

(10) Patent No.: US 7,006,659 B2
(45) Date of Patent: Feb. 28, 2006

(54) METHOD FOR EMBEDDING AND EXTRACTING A SPATIAL DOMAIN BLIND WATERMARK USING SAMPLE EXPANSION

(75) Inventors: Jin Ho Kim, Taejon (KR); Ho Wook Jang, Taejon (KR); Kyung Ae Moon, Taejon (KR); Myung Joon Kim, Taejon (KR); Young Ha Hwang, Seoul (KR)

(73) Assignee: Electronics and Telecommunications Research Institute, Taejon (KR)

( * ) Notice: Subject to any disclaimer, the term of this patent is extended or adjusted under 35 U.S.C. 154(b) by 772 days.

(21) Appl. No.: 10/173,160

(22) Filed: Jun. 18, 2002

(65) Prior Publication Data

US 2003/0174858 A1    Sep. 18, 2003

(30) Foreign Application Priority Data

Mar. 15, 2002   (KR)  .............................. 2002-14114

(51) Int. Cl.
*G06K 9/00*   (2006.01)
(52) U.S. Cl. ...................................... 382/100
(58) Field of Classification Search .................... None
See application file for complete search history.

(56) References Cited

U.S. PATENT DOCUMENTS

| | | | |
|---|---|---|---|
| 6,553,127 B1 * | 4/2003 | Kurowski | 382/100 |
| 6,671,407 B1 * | 12/2003 | Venkatesan et al. | 382/232 |
| 6,823,455 B1 * | 11/2004 | Macy et al. | 713/176 |
| 2002/0054355 A1 * | 5/2002 | Brunk | 358/3.28 |
| 2002/0129253 A1 * | 9/2002 | Langelaar | 713/176 |
| 2003/0172275 A1 * | 9/2003 | Lee et al. | 713/176 |

FOREIGN PATENT DOCUMENTS

KR    2001-81182    8/2001

OTHER PUBLICATIONS

Langelaar, et al; *Robust Labeling Methods for Copy Protection of Images*; SPIE-Int. Soc. Opt. Eng. Proceedings; vol. 3022; Feb. 1997; pp. 298-309.
Jin Ho Kim, et al; *A Spatial Domain Blind Watermarking by Sample Expansion*; Korean Society of Broadcast Engineers Seminar II, 2001; Nov. 24, 2001; pp. 169-174.

* cited by examiner

Primary Examiner—Jingge Wu
Assistant Examiner—Ashutosh Upreti
(74) Attorney, Agent, or Firm—Mayer, Brown, Rowe & Maw LLP

(57) ABSTRACT

Disclosed is a method for embedding and extracting a spatial domain blind watermark using a sample expansion. The sample expansion method using a sample expansion coefficient is introduced to basically improve a common disadvantage of the conventional watermarking method based on the patchwork method, for instance, the watermark is not robust against a compression attack such as JPEG. By applying the sample expansion to a sample group, the embedded watermark comes to contain a low frequency component more larger than ever, so that radio frequency component decreases as much. Thus, although the radio frequency component of the watermark is damaged by the image compression such as JPEG, it is possible to relatively reduce the damage of the watermark. Also, an adaptive watermark embedding method can be considered such that the embedded watermark value is proportional to an average value of the pixel. In order to overcome non-robustness that is a common disadvantage of the conventional methods based on the conventional patchwork method or the conventional modified patchwork method, not a single pixel but sample-expanded pixel is chosen, and there is proposed a spatial domain blind watermarking method using a watermark value that is proportional to an average value of pixel every tile.

14 Claims, 7 Drawing Sheets

128X128 PN code
(1X1 expanded sample)

32X32 PN code
(4X4 expanded sample)

DCT result of 128X128 PN code
(1X1 expanded sample)

DCT result of 32X32 PN code
(1X1 expanded sample)

METHOD FOR EMBEDDING AND EXTRACTING A SPATIAL DOMAIN BLIND WATERMARK USING SAMPLE EXPANSION

BACKGROUND OF THE INVENTION

1. Field of the Invention

The present invention relates to a method for embedding and extracting a spatial domain blind watermark using a sample expansion, and more particularly, to a method for embedding and extracting a spatial domain blind watermark using a sample expansion which is applied for protecting a copyright information of a digital image or a digital video among digital contents.

2. Description of the Related Art

Watermarking is a kind of copyright protection technology in which a copyright holder's signal (watermark) that cannot be perceived by human being is embedded in digital data such as image, audio, video, etc., and the embedded watermark is then extracted to enable to claim the copyright. The watermark can be embedded in a logo style that can be visually perceived by human being, but due to easy deletion, deterioration of image quality, etc., many methods for embedding the watermark in a format that cannot be visually perceived by human being are being researched and used.

Then, in case that the watermark in the format that cannot be visually perceived is embedded, there are requested several conditions.

First is the invisibility that cannot be visually perceived by human being. In other words, the embedding of the watermark should not cause the quality of an original image to be lowered, and even though the quality lowering is caused, it should not be visually extracted.

Second is the robustness. In other words, although the embedded watermark is subject to various image processing or other's intentional attacks for deleting the watermark, it should be not deleted. There are various image processing technologies, for instance, loss and compression technology such as JPEG, image blurring, sharpening, analog/digital conversion, digital/analog conversion and the like, and the embedded watermark should be robust against these various attacks.

Third is the unambiguity of the watermark, which indicates a property in which the ownership of the embedded watermark is correctly discriminated. In other words, there should not occur problems in that non-embedded watermark is mistaken as if it is embedded or in that the embedded watermark is incorrectly perceived as the other's watermark.

Thus, embedding the copyright holder's inherent watermark that is not visually perceived in an image of the copyright holder, enables to solve the copyright problem when a third party claims the copyright of the image or illegally used the image, by extracting the embedded watermark of the original copyright holder. Also, when an image in which a purchaser's watermark is embedded, is sold and then the purchaser distributes the image illegally, the watermark extracted from the illegally distributed image enables to discriminate the purchaser. Thus, the watermark can be effectively used for the copyright protection of a digital image and the prevention of data copy.

The blind watermarking does not use the original image in order to extract the watermark, and is divided into a spatial domain watermarking and a frequency domain watermarking. Bender et al proposes a patchwork method that is one kind of the spatial domain watermarking methods that are widely spread. After that, many modifications of the patchwork method were proposed, and the invention employs the patchwork method basically.

In other words, the conventional patchwork method or a modification thereof selects a samples group and adds or subtracts a certain constant value to or from the sampled pixel. From the interpretation of the frequency domain, the above action results in adding a watermark component having a radio frequency component to an original image. Since the image compression such as JPEG contains an image processing procedure for removing the radio frequency component from the original image, if the watermark-embedded component is subject to the image compression attack, the image is severely damaged, so that there is generated a problem in that the embedded watermark is not extracted correctly.

SUMMARY OF THE INVENTION

Accordingly the present invention has been devised to solve the foregoing problems of the prior art, and it is an object of the invention to provide a method for embedding and extracting a spatial domain blind watermark using a sample expansion in which a sampling is performed by the sample expansion and a radio frequency component of the watermark is suppressed depending on a degree of the sample expansion, thereby decreasing damage of the watermark against a compression attack such as JPEG and the like.

To accomplish the above object, there is provided a method for embedding and extracting a spatial domain blind watermark using a sample expansion in a watermarking method for embedding a watermark information for protecting a copyright of a digital image into the image. The method comprises the steps of: creating a pseudo binary random number having a constant size in row and column directions and setting a sample-pair according to the pseudo binary random number; expanding the pseudo binary random number by a constant size in the row and column directions according to a set sample expansion coefficient; tiling the expanded sample-pair blocks to a constant number; creating a watermark bit corresponding to the each tile and converting a polarity of the each tile according to the watermark bit information; multiplying an average pixel value every tile with a watermark embedding intensity to compute a watermark value to be embedded; and embedding the watermark in a pixel within the tile according to the computed watermark value and collecting a partial image in which the watermark is embedded, every tile, to acquire a finally watermarked image.

The step of setting the sample-pair according to the pseudo binary random number block sets the sample-pair by two samples group of a bit "1" and a bit "0". In the step of expanding the pseudo binary random number, the expanded block size is a pixel number used for embedding one bit of watermark.

Further, in the step of creating the watermark bit and converting the polarity of the each tile according to the watermark bit information, the watermark can be made by a pseudo binary random number generator or can be generated by allocating an arbitrary binary value.

Furthermore, the polarity of the each tile is converted into "+1" when the bit information of the each tile is "1", and the polarity of the each tile is converted into "−1" when the bit information of the each tile is "0".

Moreover, in the step of computing the watermark value, an average pixel value $M_{i,j}$ of an original image block with respect to all (i, j) tiles is obtained with respect to all (i, j)

tiles, and the watermark value is set to a value obtained by multiplying the $M_{i,j}$ with the k of the watermark embedding intensity.

According to another aspect of the invention, there is provided a method for embedding and extracting a spatial domain blind watermark using a sample expansion in a method for extracting a watermark information for protecting a copyright of a digital image. The method comprises the steps of tiling the digital image into sample-pair blocks at a constant size; computing an average pixel value of two samples group every tile as blocked; extracting a watermark bit every tile and determining the extracted watermark bit; and collecting the determined watermark bits every tile and acquiring a final watermark bit block.

Also, in the step of computing the average pixel value of the two samples group, the average pixel value of two samples group is computed by subtracting the average pixel value of a portion which the bit of P' is "0" from the average pixel value of a portion which a bit of P' is "1" with respect to all (i, j)-th tiles.

Further, the step of determining the extracted watermark bit determines the extracted watermark bit as "1" (a) when the average pixel value of the two samples group is 0 or more, and determines the extracted watermark bit as "0" (b) when the average pixel value of the two samples group is "0" or less.

BRIEF DESCRIPTION OF THE DRAWINGS

The above object, other features and advantages of the present invention will become more apparent by describing the preferred embodiment thereof with reference to the accompanying drawings, in which.

DETAILED DESCRIPTION OF THE PREFERRED EMBODIMENT

Hereinafter, preferred embodiments relating with a method for embedding and extracting a spatial domain blind watermark using a sample expansion of the present invention are described in detail with reference to the accompanying drawings.

First, a watermarking method using a sample expansion in accordance with the present invention, i.e., a method for creating a watermark and embedding the created watermark in a data, is described.

Figure 1:
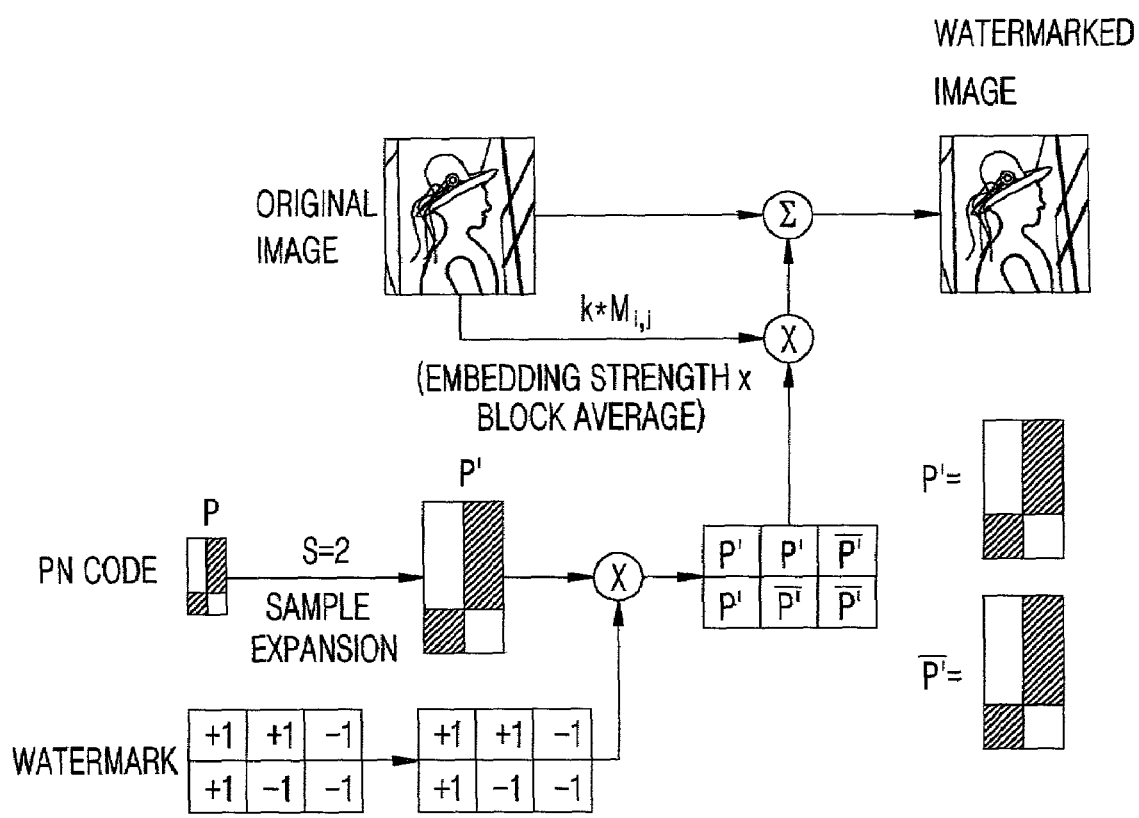
FIG. 1 is a schematic view for illustrating a method for creating and embedding a spatial domain blind watermark using a sample expansion in accordance with an embodiment of the invention.
Figure 2:
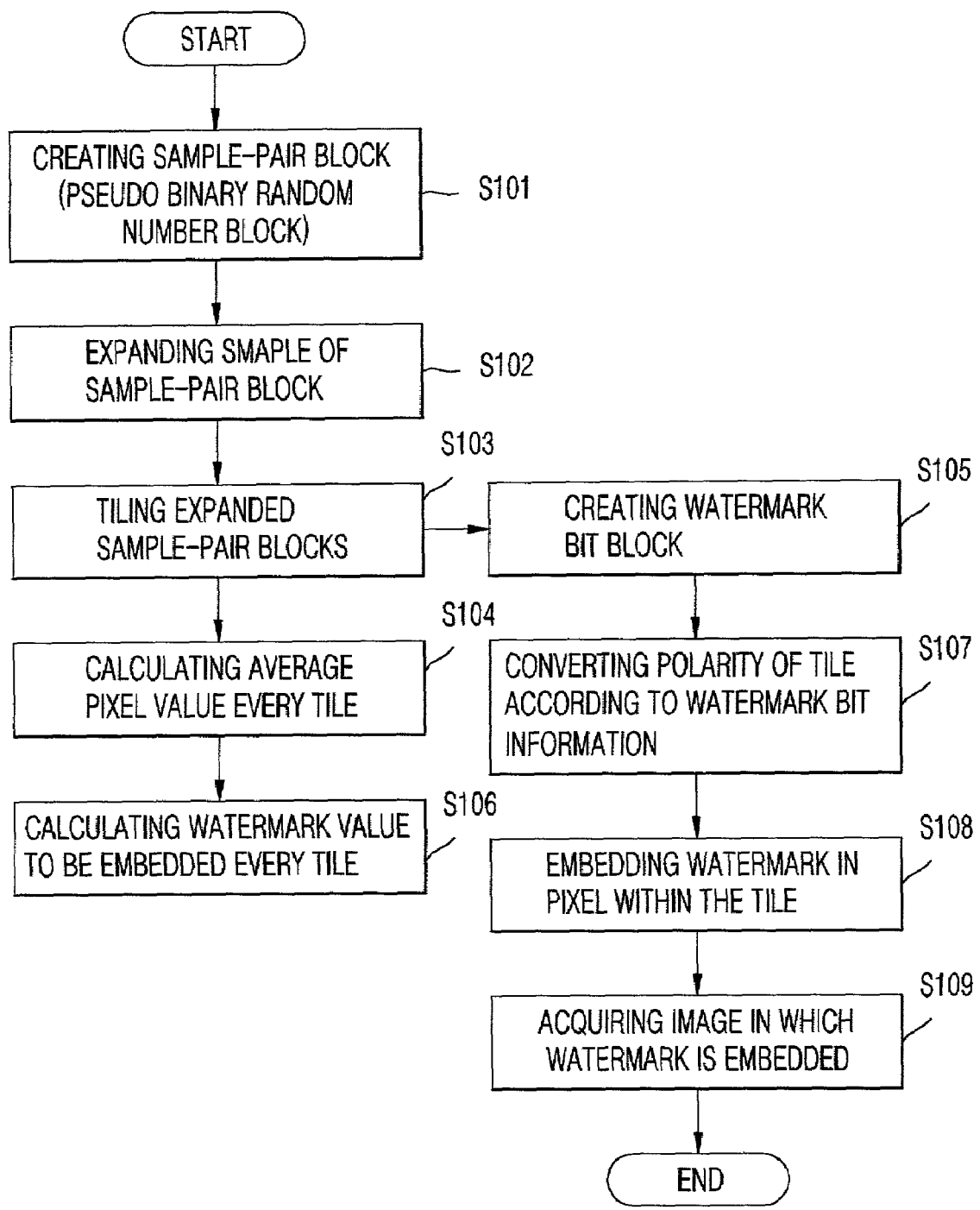
FIG. 2 is a flow chart for illustrating a method for creating and embedding a spatial domain blind watermark using a sample expansion in accordance with an embodiment of the invention.

FIG. 1 is a schematic view for illustrating a method for creating and embedding a spatial domain blind watermark using a sample expansion in accordance with an embodiment of the invention, and FIG. 2 is a flow chart for illustrating a method for creating and embedding a spatial domain blind watermark using a sample expansion in accordance with an embodiment of the invention.

FIG. 1 schematically illustrates a sample expansion procedure, a tiling procedure and a procedure for embedding a watermark bit for the creation of the watermark bit, and operation of FIG. 1 is reviewed step by step with reference to the flow chart of FIG. 2.

As shown in FIG. 2, the method for creating and embedding the watermark using the sample expansion, includes: a step (S101) of setting a sample-pair according to a pseudo binary random number block; a step (S102) of expanding the sample-pair; a step (S103) of tiling the expanded sample-pair blocks; a step (S104) of computing an average pixel value every tile; a step (S105) of creating a watermark bit corresponding to the each tile; a step (S106) of computing a watermark value to be embedded every tile; a step (S107) of converting a polarity of the tile according to a bit information of the watermark; a step (S108) of embedding the watermark in a pixel within the tile; and a step (S109) of acquiring an image in which the watermark is embedded.

Hereinafter, the aforementioned steps are concretely described.

First, reviewing the step (S101) of setting the sample pair according to the pseudo binary random number block, a pseudo binary random number block having a size of $P_R$ in row direction and a size of $P_C$ in column direction is created. A seed value for creating the pseudo binary random number corresponds to a key of the watermark. For a product value of $P_R$ and $P_C$, i.e., $P_R \times P_C$ to have an even value, $P_R$ and $P_C$ are set such that $P_R$ has a positive even number and $P_C$ is a positive integer value.

Figure 3:
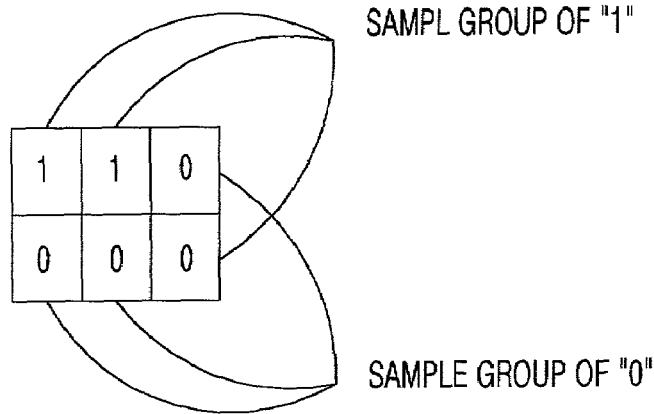
FIG. 3 is a schematic view showing one example of a sample-pair block.

Further, the created pseudo binary random number is made such that the number of "1" is identical to the number of "0". Positions of "1" and "0" are indicative of a pair of samples group. The created pseudo binary random block is defined as P. Here, one example of the sample pair block is shown in FIG. 3. FIG. 3 is a schematic view showing one example of a method for setting portions of bit "1" and bit "0" into two sample groups by generating the pseudo binary random number at a rectangular-shaped block.

Next, reviewing the step (S102) of expanding the sample-pair, the block P is expanded by a sample expansion coefficient "s" in the row and column directions. Here, the expanded block is defined as P'.

Especially, if the sample expansion coefficient "s" is a constant "d", the "d" is defined as an integer that is not 1 ($d \neq 1$) and greater than 1, i.e., $d \geq 2$. The sample expansion coefficient "s" is meant by that a pixel block not expanded to a size of 1×1 but expanded to a size of d×d, for instance, 2×2, 3×3, 4×4, etc., is dealt with one sample.

Figure 4:
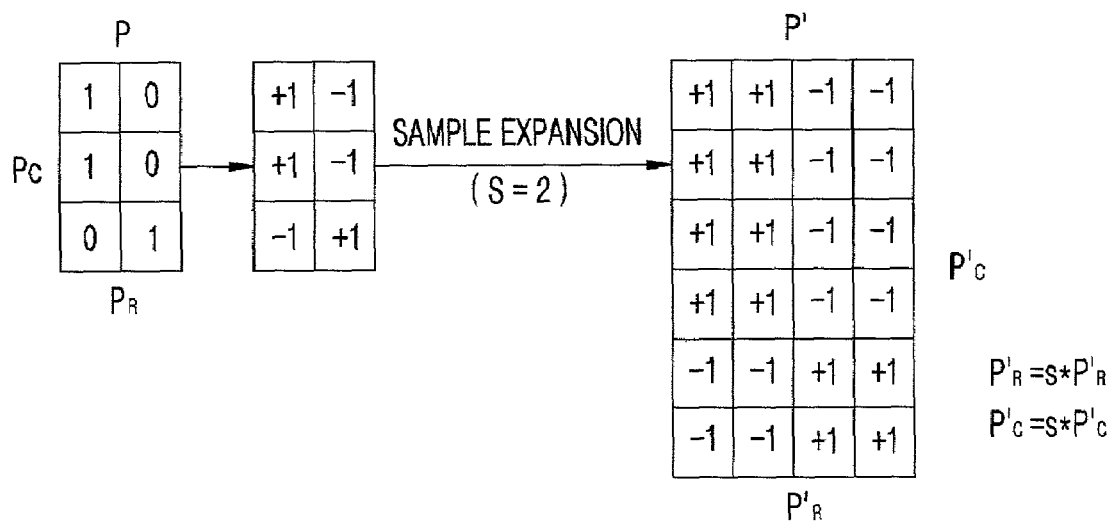
FIG. 4 is a schematic view showing one example of a method for expanding a sample-pair block in the step of S102 shown in FIG. 2.

P' has a size corresponding to the number of pixels used for embedding one bit of watermark. In the P' block, the value of "1" is substituted for the value of "+1", and the value of "0" is substituted for the value of "−1". One example for expanding the sample pair block is shown in FIG. 4. FIG. 4 schematically shows to create the block P' by performing the sample expansion by the sample expansion coefficient "s".

The size of P shown in FIG. 4 is $P_R \times P_C = 3 \times 2$, and the size of P' that is sample-expanded is $P_R' \times P_C' = (s \times P_R) \times (s \times P_C) = 6 \times 4$.

The step (S103) of tiling the expanded sample-pair blocks, i.e., tiling of P, covers an overall surface of an original image I having a size of R×C by tiling the P'.

Figure 5:
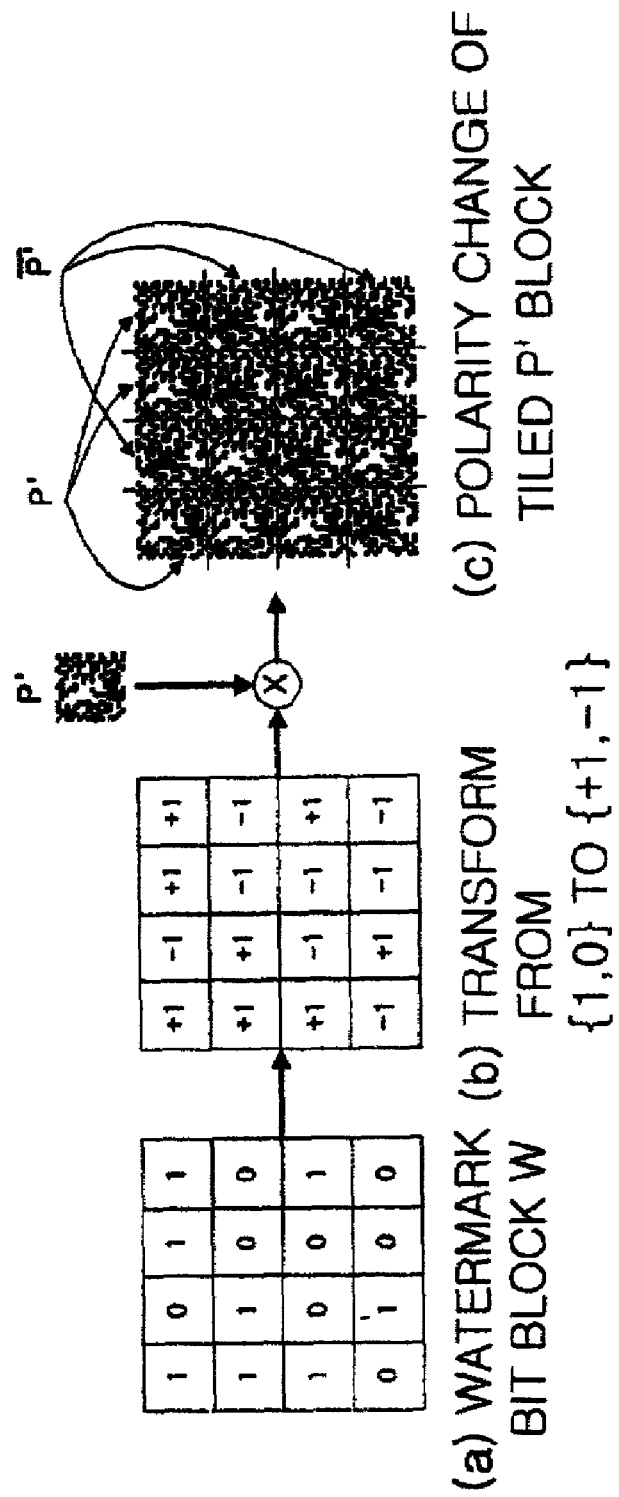
FIG. 5 is a schematic view showing one example of a method for creating a tiled sample expansion block.

The number of tiles is $\lfloor R/P_R' \rfloor \times \lfloor C/P_C' \rfloor$, where $\lfloor * \rfloor$ is the largest integer among numbers less than the *. One example of the tiled sample expansion block is shown in FIG. 5c. FIG. 5c is a schematic view showing an example in which P' is tiled by a block of 4×4. In other words, as shown in FIG. 5a, bit "1" of a watermark bit block W is first converted into "+1" and bit "0" of the watermark bit block W is converted into bit "−1".

Next, again referring to FIG. 2, there is described the step (S105) of creating the watermark bit corresponding to the respective tiles, and the step (S107) of converting the polarity of the tile according to a bit information of the watermark.

First, there is prepared a watermark bit, which is being embedded in the original image I having a size of R×C. The maximum number of the watermark bit is $\lfloor R/P_R' \rfloor \times \lfloor C/P_C' \rfloor$, and is identical to the number of the P' tiles.

The watermark can be made by the pseudo binary random number generator, or may be allocated an arbitrary binary value. With respect to the prepared watermark block W, a value "1" is substituted for a value "+1", and a value "0" is substituted for a value "−1". One example of the watermark bit block W having the size of 4×4 and a procedure for converting bits of {1, 0} of the watermark bit block W into bits of {+1, −1} are shown in FIGS. 5a and 5b.

The step (S104) of computing the average pixel value every tile, shown in FIG. 2, computes an average pixel value $M_{i,j}$ of an original image block corresponding to a tile (i, j) with respect to all tiles of (i, j) so as to decide a value of the watermark to be embedded.

Afterwards, the step (S106) of computing the watermark value every tile is carried out. In this step, a value of the watermark to be embedded every tile, $\lceil k \times M_{i,j} \rceil$ is computed by multiplying a (i, j)-th average pixel value every tile, $M_{i,j}$ with the watermark embedding intensity, k. Here, $\lceil * \rceil$ is the smallest integer among integers less than the *.

Since the watermark value to be embedded is an adaptive watermark embedding method that is proportional to an average value of the pixels, a strong watermark is embedded in a portion having a large pixel value and a weak watermark is embedded in a portion having a small pixel value. Although a variation in the pixel value is large in the portion having the large pixel value, human being cannot perceive the variation with ease, and thus the strong watermark can be embedded. Here, a watermark value, which is being embedded in a (i, j)-th tile can be expressed as the following equation 1:

Watermark value which is being embedded in the (i, j)-th tile=$\lceil k \times M_{i,j} \rceil$   Equation 1, where k is the watermark embedding intensity, $M_{i,j}$ is a (i, j)-th average pixel value every tile. In other words, this means that increase of the watermark embedding intensity enables to embed the watermark at a much higher intensity, and also to enhance the robustness that is endurable against attacks.

However, since the strong watermark has a drawback deforming the original image too much, its value is properly chosen within a range of 0.01–0.1.

Next, there is performed the step (S108) of embedding the watermark into the pixel within the tile. In this step, a partial block of the original image corresponding to the (i, j)-th tile is defined as $O_{i,j}$. The size of $O_{i,j}$ is identical to that of the sample-expanded block P'. The watermark is embedded every $O_{i,j}$ block to thereby obtain a tile block $E_{i,j}$ into which the watermark is embedded.

The watermark is embedded into the pixel within the tile by adding and subtracting the watermark value every tile computed in the step (S104) to or from the pixel value of each image block $O_{i,j}$ using the following equation 2:

$$E_{i,j} = O_{i,j} + W_{i,j} \times \lceil k \times M_{i,j} \rceil \times P' \qquad \text{Equation 2.}$$

$$\begin{aligned} E_{i,j} &= O_{i,J} + \lceil k \times M_{i,J} \rceil \times P' (\text{if, } W_{i,j} = +1) \\ &= O_{i,J} - \lceil k \times M_{i,J} \rceil \times P' (\text{if, } W_{i,j} = -1). \end{aligned} \qquad \text{Equation 3}$$

In the above equation 2, $W_{i,j}$ is the value of (i, j) term of the watermark block W created in the step (S105). Referring to Equation 2, if the watermark $W_{i,j}$ is "+1", the watermark value is added to the pixel value, and if the watermark $W_{i,j}$ is "−1", the watermark value is subtracted from the pixel value. The equation 2 can be expressed by the equation 3.

Also, the meaning of the term $W_{i,j} \times P'$ in the equation 2 can be described using FIG. 5c. From FIG. 5c, it is well seen that P' is tiled with the inverted polarity.

If the step (S108) of embedding the watermark every tile is completed, there is performed the step (S109) of acquiring the image into which the watermark is embedded. In other words, the watermark embedding procedure is performed as the above with respect to all (i, j)-th tiles, $O_{i,j}$ is substituted for $E_{i,j}$ to thereby make an image I' in which the watermark is embedded.

Hereinafter, there is further described the step (S109) of acquiring the image that is the main element of the present invention.

$M_1$ is defined as an average pixel value of a portion where the bit of P' is "1" in $O_{i,j}$ and $M_0$ is defined as an average pixel value of a portion where the bit of P' is "0" in $O_{i,j}$.

Before and after the embedding of the watermark, the average pixel value is varied, and can be expressed by the following equation 4:

$$M = (M_1 + M_0)/2,$$

where, since $M_1 \approx M_0$, it can be seen that $M \approx M_1 \approx M_0$.

The average pixel value M of after the embedding of the watermark is not varied, but $M_1$ and $M_0$ are varied with the embedded watermark bit.

According to the proposed algorithm, if the embedded watermark bit is "1", $M_1$ increases by $\lceil k \times M \rceil$, and $M_0$ decreases by $\lceil k \times M \rceil$. On the contrary, if the embedded watermark bit is "0", $M_1$ decreases by $\lceil k \times M \rceil$, and $M_0$ increases by $\lceil k \times M \rceil$.

However, the term M of the equation 4 is not changed before and after the embedding of the watermark because the value $\lceil k \times M \rceil$ is added to $M_1$ and is also subtracted from $M_0$.

From the above fact, by comparing the values of $M_1$ and $M_0$ upon extracting the watermark, it is possible to find the bit of the embedded watermark.

The watermark which can be embedded in an image having a size of R×C is a total of $\lfloor R/P_R' \rfloor \times \lfloor C/P_C' \rfloor$ bits. For instance, if the size of the original image is 512×512, and the size of P' is 32×32, it is possible to embed a total of 256 bits.

Hereinafter, there is described a method for blind-extracting a watermark embedded in an image regardless of an original image with reference to the accompanying FIG. 6.

Figure 6:
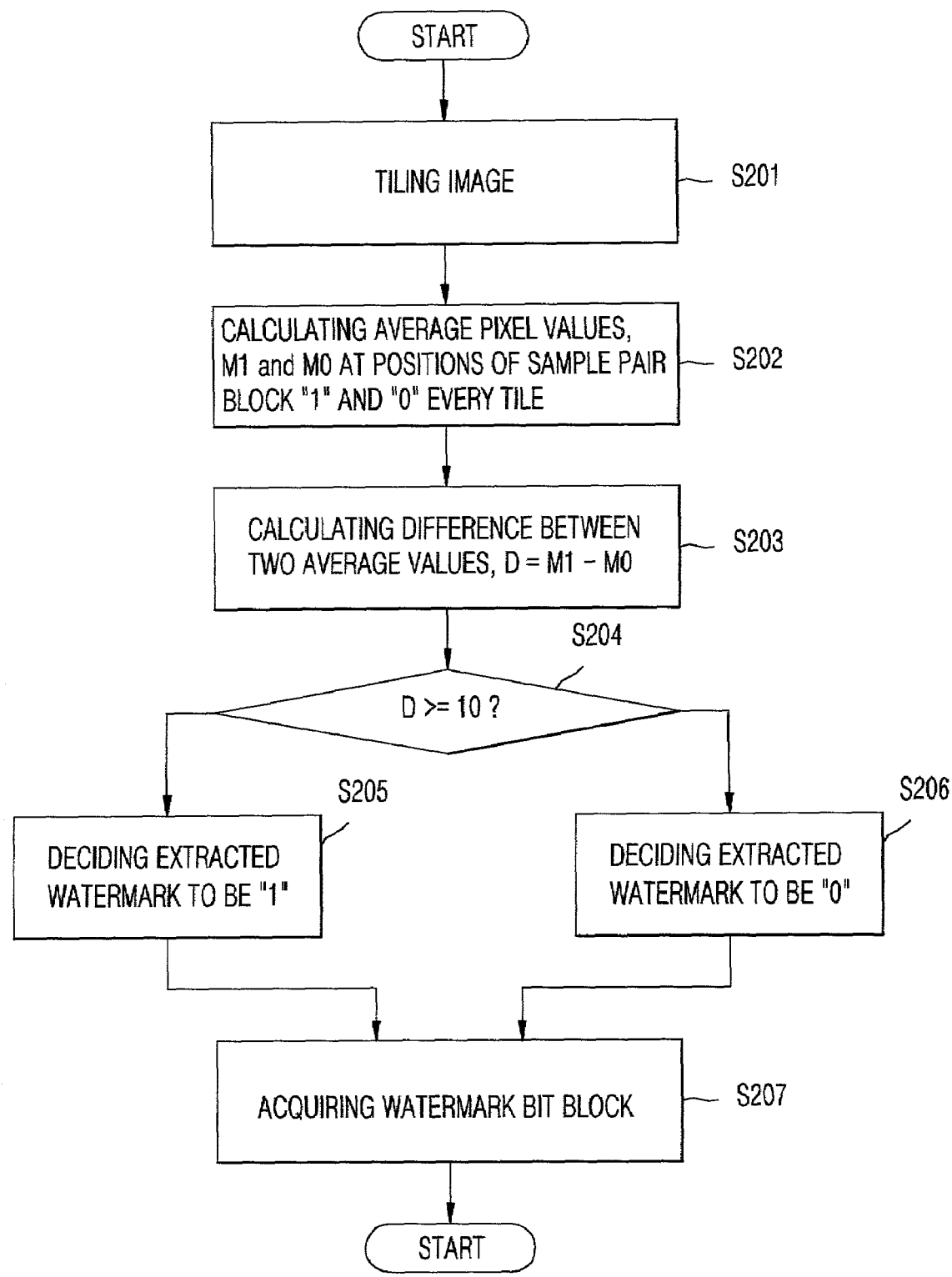
FIG. 6 is a flow chart for illustrating a method for extracting a spatial domain blind watermark using a sample expansion in accordance with the present invention.

FIG. 6 is a flow chart for illustrating a method for extracting a spatial domain blind watermark using a sample expansion in accordance with another preferred embodiment of the present invention. In order to extract the watermark, there is no needed the original image, but there are needed information, P which is used for embedding the watermark, the sample expansion coefficient, the size of the watermark bit block W, etc.

The method for extracting a watermark blind using the sample expansion includes: a step (S201) of tiling a digital image into sample-pair blocks at a constant size; a step (S202) of computing an average pixel value every tile; and steps (S203–S207) of extracting a watermark bit every tile and determining the extracted watermark bit. Hereinafter, these steps are described in more detail.

First, in the step of S201, an original image is tiled into an image having a size of P'. Here, the number of tiles is identical to that of tiles of when the watermark is embedded, and the size of the watermark bit block W is identical to the number of the tiles.

Thereafter, in the step of S203, the average pixel value of two samples group every tile as tiled can be obtained using the following equation 5:

$$D_{i,j} = M_1 - M_0 \qquad \text{Equation 5.}$$

In other words, an average pixel value $M_1$ of portions where the bit of P' is "1" with respect to all (i, j)-th tiles and an average pixel value $M_0$ of portions where the bit of P' is "0", are respectively obtained, and then a difference between the two average pixel values is computed.

Next, in the step of S204, it is determined whether the difference $D_{i,j}$ between the two average pixel values, $M_1$ and $M_0$ is "0" or more.

As a result of the determining step, if the $D_{i,j}$ is 0 or more, it is decided that the extracted watermark bit is "1" (S205), and if the $D_{i,j}$ is less than 0, it is decided that the extracted watermark bit is "0" (S206).

When it is assumed that there is a relationship of $M_0 \tilde{} M_1$ upon the insertion of the watermark and there is no damage due to the attack, an ideal value of $D_{i,j}$ on the extraction of the watermark has a value of $+2\lceil k \times M_{i,j} \rceil$ when the embedded watermark bit is "1", and the ideal value of $D_{i,j}$ on the extraction of the watermark has a value of $-2\lceil k \times M_{i,j} \rceil$ when the embedded watermark bit is "0".

Thereafter, the extracted watermark bits are collected to constitute the watermark bit block. (S207)

Figure 7:
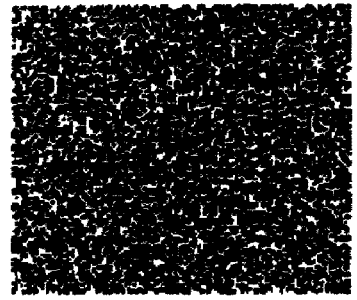
FIG. 7 is a schematic view showing that a radio frequency component is decreased by a sample expansion in accordance with the present invention.
Figure 7:
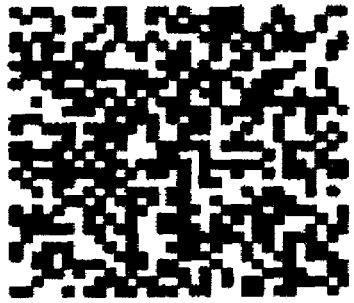
Figure 7:
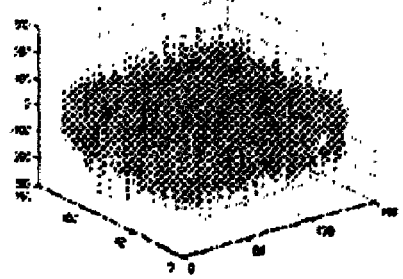
Figure 7:
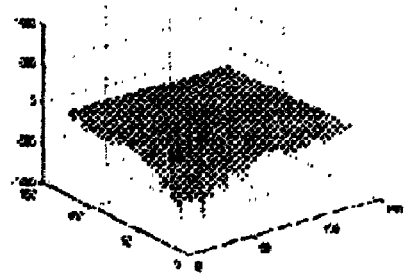
Figure 8:
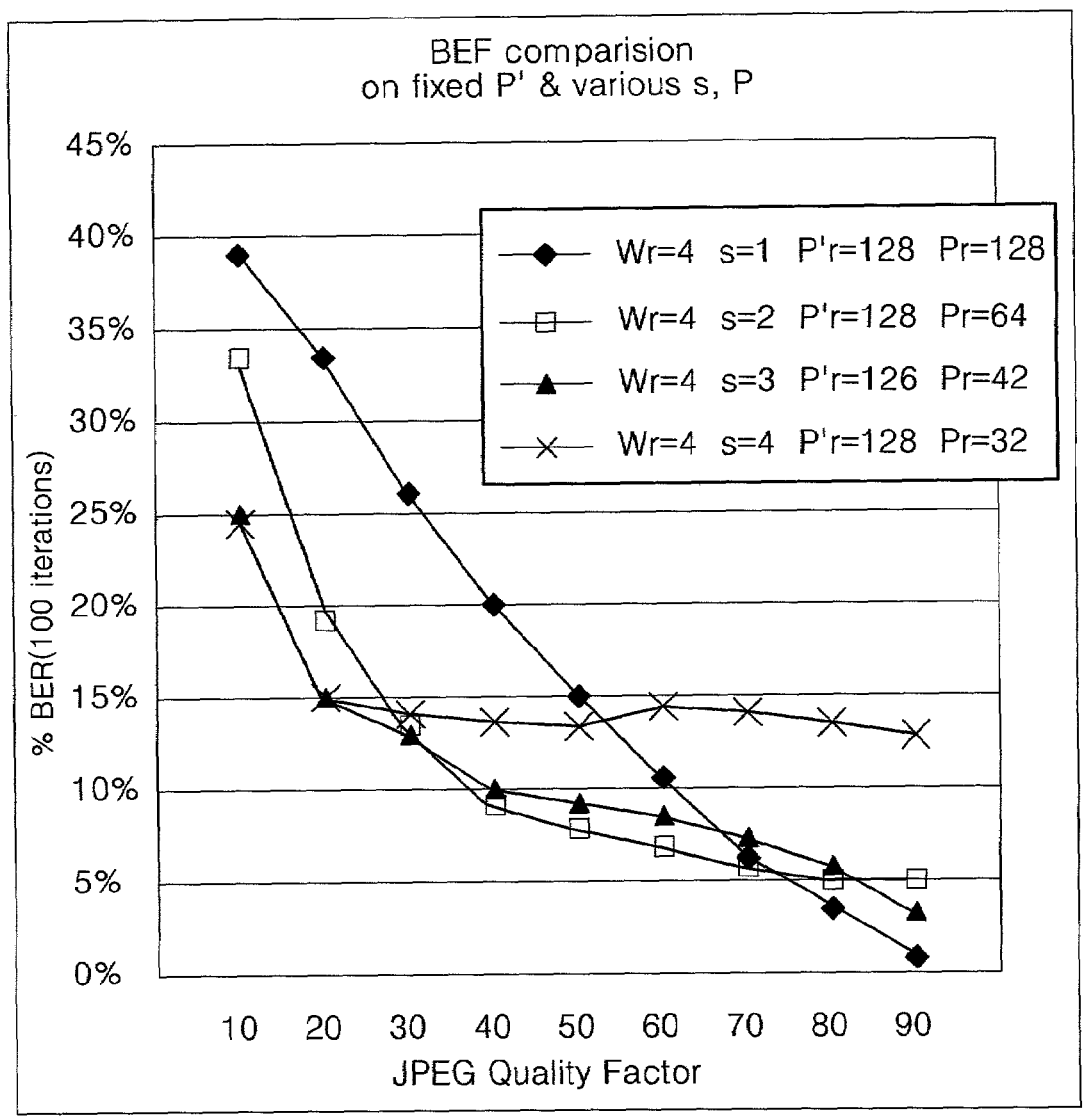
FIG. 8 is a graph showing results of watermark extraction performance in accordance with the watermark extraction method shown in FIG. 6.

FIG. 7 is a schematic view showing that a radio frequency component is decreased by the sample expansion, and FIG. 8 is a graph showing results of watermark extraction performance in accordance with the watermark extraction method shown in FIG. 6.

Referring to FIG. 7, a pseudo binary random number block having a size of 128×128 and a pseudo binary random number block having a size of 32×32 are respectively expanded by a size of the sample expansion coefficient s=5 to create sample expansion blocks each having a size of 128×128. The created sample expansion blocks are DCT (Discrete Cosine Transform)-treated in order to compare radio frequency components with each other. As shown in FIG. 7, the radio frequency component of the sample-expanded block is much reduced, which means that the watermark damage by the compression attack of JPEG and so on can be reduced.

In FIG. 8, there is shown one example in which the extraction performance of the watermark is computed using the sample expansion. Concretely, FIG. 8 is a graph showing the extraction performance as the function of the sample expansion coefficient "s" in a simulation experiment of JPEG attack when a watermark bit block having a size of 4×4 is embedded under a condition in which the size of the sample expansion block P' is fixed to have an identical pixel number per unit pixel. From the graph of FIG. 8, upon an attack of JPEG quality factor of 50 or less, it is well seen that the performance of when s has a large number is higher than the performance of when s=1 which sample is not expanded. This result means that the sample expansion allows the watermark to be robust against radio frequency removing attack of JPEG.

As described previously, a method for extracting a spatial domain blind watermark using a sample expansion in accordance with the present invention basically solves a common disadvantage of the conventional methods based on the patchwork method, in which the embedded watermark is not robust against a compression attack such as JPEG.

Also, in case of the conventional methods, the sample groups have only a single radio frequency component basically since when the sample group is chosen so as to embed the watermark, the samples are chosen one by one. This radio frequency component is easily damaged by image compression such as JPEG containing an image processing procedure for removing the radio frequency component from the original image, so that the robustness of the embedded watermark is weakened.

Differently from the conventional methods, by applying the sample expansion to the samples group, the embedded watermark contains more amount of low frequency component, so that radio frequency component decreases as much. So, although the radio frequency component of the watermark is damaged by the image compression such as JPEG, it becomes possible to decrease the damage of the watermark relatively.

Although the preferred embodiments of the present invention have been disclosed for illustrative purposes, those skilled in the art will appreciate that various modifications, additions and substitutions can be made without departing from the scope and spirit of the invention as defined in the accompanying claims.

What is claimed is:

1. A method for embedding and extracting a spatial domain blind watermark using a sample expansion in a watermarking method for embedding a watermark information for protecting a copyright of a digital image in the digital image, the method comprising the steps of:

creating a pseudo binary random number having a constant size in row and column directions and setting a sample-pair according to the pseudo binary random number;

expanding the pseudo binary random number by a constant size in the row and column directions according to a set sample expansion coefficient;

tiling the expanded sample-pair blocks at a constant number;

creating a watermark bit corresponding to the each tile and converting a polarity of the each tile according to the watermark bit information;

multiplying an average pixel value every tile with a watermark embedding intensity to compute a watermark value to be embedded; and embedding the watermark in a pixel within the tile according to the computed watermark value and collecting a partial image in which the watermark is embedded, every tile to acquire a finally watermarked image.

2. The method of claim 1, wherein the step of setting the sample-pair according to the pseudo binary random number block sets the sample-pair by two samples group of a bit "1" and a bit "0".

3. The method of claim 1, wherein the step of expanding the pseudo binary random number expands the pseudo binary random number to the constant size according to a sample expansion coefficient that is set to deal with a pixel block that is not a single pixel of 1×1 but is expanded to a size of d×d (d is a positive integer except for 1).

4. The method of claim 1, wherein the tiling step computes the number of the tiles using a following equation:

Number of tiles=$\lfloor R/P_R' \rfloor \times \lfloor C/P_C' \rfloor$ where $\lfloor * \rfloor$ is the largest integer among numbers less than the *, and $P_R'$ and $P_C'$ are indicative of sizes of the expanded block in row and column.

5. The method of claim 1, wherein in the step of creating the watermark bit and converting the polarity of the each tile according to the watermark bit information, the watermark can be made by a pseudo binary random number generator or can be generated by allocating an arbitrary binary value.

6. The method of claim 1, wherein the polarity of the each tile is converted into "+1" when the bit information of the each tile is "1", and the polarity of the each tile is converted into "−1" when the bit information of the each tile is "0".

7. The method of claim 1, wherein in the step of computing the watermark value, the average pixel value every tile is obtained by computing an average pixel value Mi,j of an original image block with respect to all (i, j) tiles in order to decide the value of the watermark value to be embedded.

8. The method of claim 1, wherein the step of computing the average pixel value every tile computes the watermark value every tile using a following equation:

$\lceil k \times M_{i,j} \rceil$ where k is the watermark embedion intensity, $M_{i,j}$ is a (i, j)-th average pixel value every tile, and $\lceil * \rceil$ is the smallest integer among integers less than the *.

9. The method of claim 1, wherein the step of acquiring the watermarked image embeds the watermark into the pixel within the tile using a following equation:

$E_{i,j}=O_{i,j}+W_{i,j} \times \lceil k \times M_{i,j} \rceil \times P'-$ where, $E_{i,j}$ is a tile block into which the watermark is embedded, $O_{i,j}$ is a partial block of an original image corresponding to a (i, j)-th tile, and $W_{i,j}$ is a value of (i, j) term of a block W.

10. The method of claim 9, wherein the (i, j) term of the block W and the sample expanded block P' have a value of "+1" or "−1".

11. The method of claim 1, after embedding the watermark value every tile, further comprising a step of embedding the watermark using a following equation such that the average value of the pixel every tile is not changed;

$$E_{i,j} = O_{i,j} + \lceil k \times M_{i,j} \rceil \times P' (\text{if, } W_{i,j} = +1)$$
$$= O_{i,j} - \lceil k \times M_{i,j} \rceil \times P' (\text{if, } W_{i,j} = -1)$$

where, Ei, j is a tile block in which the watermark is embedded, $O_{i,j}$ is a partial block of an original image corresponding to a (i, j)-th tile, and $W_{i,j}$ is a value of (i, j) term of a block W.

12. A method for embedding and extracting a spatial domain blind watermark using a sample expansion in a method for extracting a watermark information for protecting a copyright of a digital image, the method comprising the steps of:

tiling the digital image into sample-pair blocks at a constant size;

computing an average pixel value of the blocked two samples group every tile;

extracting a watermark bit every tile and determining the extracted watermark bit; and collecting the determined watermark bits every tile and acquiring a final watermark bit block.

13. The method of claim 12, wherein the step of computing the average pixel value of the two samples group, computes the average pixel value using a following equation:

$$D_{i,j}=M_1-M_0$$

Where, $D_{i,j}$ is the average pixel value of the two samples group, $M_1$ is the average pixel value of a portion which a bit of P' is "1" with respect to all (i, j)-th tiles, and $M_0$ is the average pixel value of a portion which the bit of P' is "0".

14. The method of claim 12, wherein the step of determining the extracted watermark bit determines the extracted watermark bit as "1" when the average pixel value of the two samples group is 0 or more, and determines the extracted watermark bit as "0" when the average pixel value of the two samples group is 0 or less.

* * * * *